DISPLAY DATA PROCESSOR

Filed June 29, 1964 5 Sheets-Sheet 1

INVENTOR:
FREDERICK D. STROUT,
BY Delbert P. Warner
HIS ATTORNEY.

DISPLAY DATA PROCESSOR

Filed June 29, 1964 5 Sheets-Sheet 2

INVENTOR:
FREDERICK D. STROUT,
BY Delbert P. Warner
HIS ATTORNEY.

INVENTOR:
FREDERICK D. STROUT,
BY Delbert A. Warner
HIS ATTORNEY.

DISPLAY DATA PROCESSOR

Filed June 29, 1964 5 Sheets-Sheet 4

INVENTOR:
FREDERICK D. STROUT,

BY Delbert P. Warner
HIS ATTORNEY.

INVENTOR:
FREDERICK D. STROUT,
BY Delbert P. Warner
HIS ATTORNEY 3,396,377
Patented Aug. 6, 1968

3,396,377

DISPLAY DATA PROCESSOR

Frederick D. Strout, Liverpool, N.Y., assignor to General Electric Company, a corporation of New York Filed June 29, 1964, Ser. No. 378,696
7 Claims. (Cl. 340—324)

ABSTRACT OF THE DISCLOSURE

The invention is directed to a display data processor capable of accepting signals in digital or binary form from a computer or other data source, and converting such signals to raster scan signals for generating television or other raster displays. The processor includes a library for storage of symbols to be displayed, includes means for changing library stored symbols by programming, and is capable of point-to-point generation of symbols not available in the library. The processor permits changes in any part of the display from frame to frame, and accomplishes repetitive read out at a flicker free rate.

The present invention relates to means for converting message having digital or binary form into a form suitable for use in generating television, or other raster displays. In particular, it involves means for receiving digital messages, interpreting them, accumulaitng the interpreted signals into a storage device and presenting the cumulative messages as visual displays in a raster format.

It has become increasingly desirable to provide improved means for translating binary signals and messages into visible displays. The prior art devices employing cathode ray tubes have been limited to inflexible forms capable of producing only a limited number of symbols determined in accordance with fixed memories which could only be modified by changes in hardware. Most of these prior art devices have had no capability of generating curves or straight lines not contained in their memory units. In addition, no known prior art devices have been capable of providing full television frames which can be stored in a memory between display times and changed by received data so that successive raster scanned display frames reflect the changes.

It is, therefore, a primary object of this invention to provide improved means to translate messages from binary form to a form which may be used in generating a raster display.

It is a further object of this invention to convert relatively slowly presented binary signals to representations which may be stored and then used to generate video signals for use in presenting the elements of a picture on a raster scanned cathode ray tube.

It is another object of this invention to provide means by which a stored compilation of signals representing a television frame may be varied by binary messages to provide changes in successive frames.

It is yet another object of this invention in a display data processor to provide means of access to a library of recorded symbols which can be used in the generation of raster scanned images.

It is still another object of this invention to provide improved means for generating the locations of individual points in a raster scanned display.

It is still a further object of this invention to provide a library of symbols, for use with a raster scanned display, which can be varied by programming rather than by hardware replacement or modification.

It is yet a further object of this invention to provide means for presenting successive full frames of video signals at normal video rates while varying the successive frames in accordance with binary signals received from outside the display system at slower data rates.

The foregoing objects and others ancillary thereto are accomplished in a preferred embodiment of the invention in the following manner. A binary signal received from a computer, a teletype, or other source of binary signals, is applied to an input terminal of an embodiment of the invention. A portion of the received signal is then processed by logic components to locate binary signals representing desired symbols in a stored memory, or library memory. The library signals are read out of the library and stored in a buffer storage device. Additional logic components are then used to determine from another portion of the received signal where the received signal should be located in a memory with respect to particular coordinates. When the latter determination has been made, the signals stored in the buffer storage device are read into the proper location of a central memory. In this way, the central memory may be built up to represent a whole television frame and then may be added to or changed. The central memory is read out at the same rate at which it is generated, but the resulting low frequency signal is frequency multiplied to form video signals which are capable of providing a raster scan to generate a television picture. In the event it is desired to generate symbols which do not appear in the library, means are provided to use the logic components to provide a point by point generation of symbols, where each received binary word is used to generate a single point. Means are also provided to change the library memory by programming so that a large variety of symbols may be provided from the library without making changes in the hardware.

The novel features that I consider to be characteristic of my invention are set forth with particularity in the appended claims. The invention itself, however, both as to its organization and its method of operation, together with additional objects and advantages thereof, will best be understood from the description of a specific embodiment when read in connection with the accompanying drawings, in which:

FIG. 1 is a block diagram depicting the general arrangement of a preferred embodiment of the invention.

FIGS. 2(*a*), 2(*b*) and 2(*c*) are diagrams of use in depicting the relationships between library storage and video storage on a magnetic drum used with the embodiment of FIG. 1.

Figure 1:
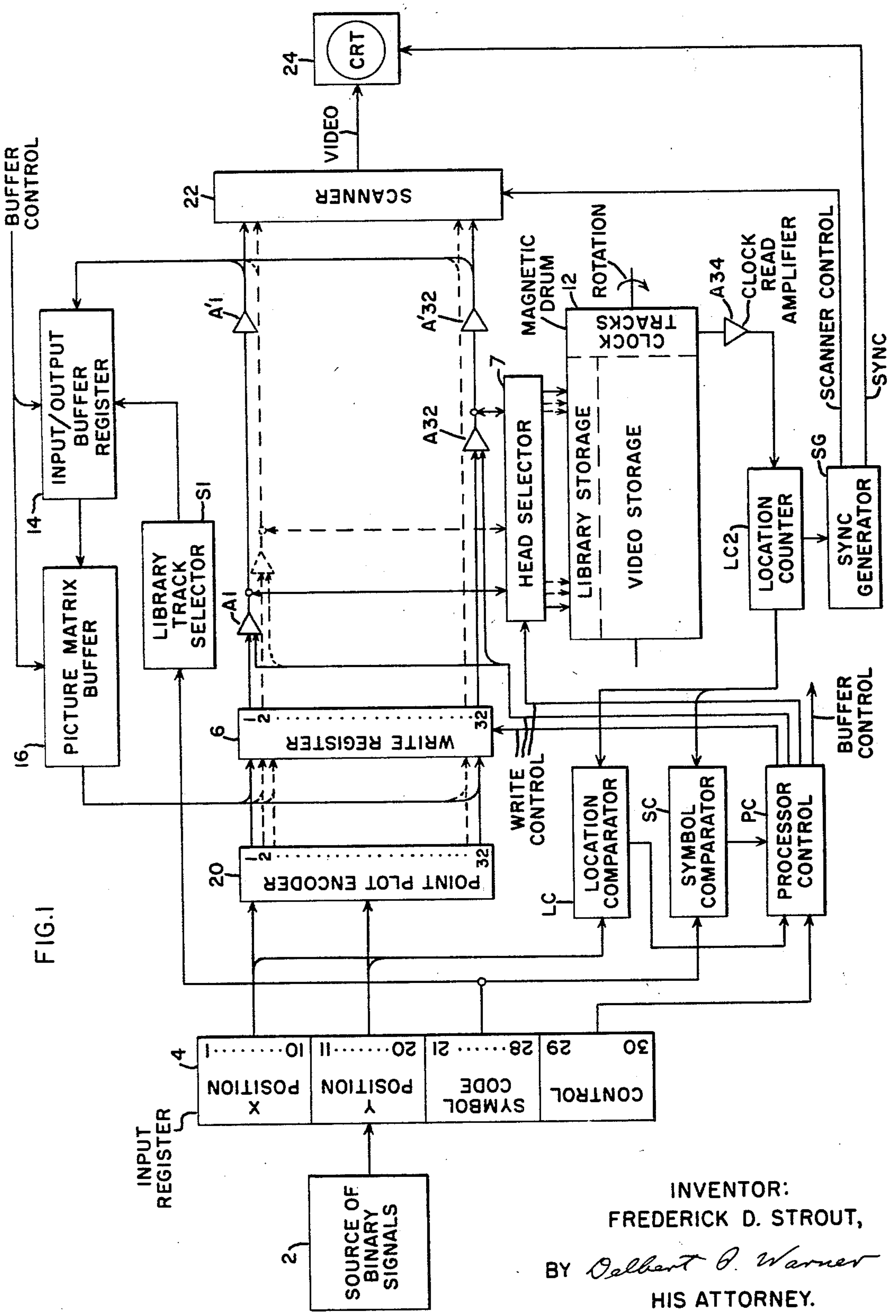

An overall view of a preferred embodiment of the present invention is shown in the block diagram of FIG. 1.

The source of signals to be utilized in the generation of a display, which is the desired end result of the present invention, is indicated at Block 2. Block 2 will be understood to represent any source of binary messages whether from a digital computer, teletype, narrow band digital television transmitter or other source of binary signals which it is desired to display. The process of writing a symbol on the display may be regarded as being initiated when a digital word such as is indicated by "X position," "Y position," "Symbol Code" and "Control" is assembled in the input buffer register 4. From Block 4, it will be noted that the format of a typical display word contains three types of information. The position bits, indicated in positions 1–20, tell the processor where the symbol or character is to appear on the display in X and Y coordinates. The symbol code, in positions 21–28, tells the processor the location, in a library memory, of the symbol, character, or number which is to appear at the stated position. The control bits, 29 and 30, are used for telling the processor to write, erase, or perform a library function and, if more control bits are supplied, may be used to control color, brightness, etc.

Figure 3:
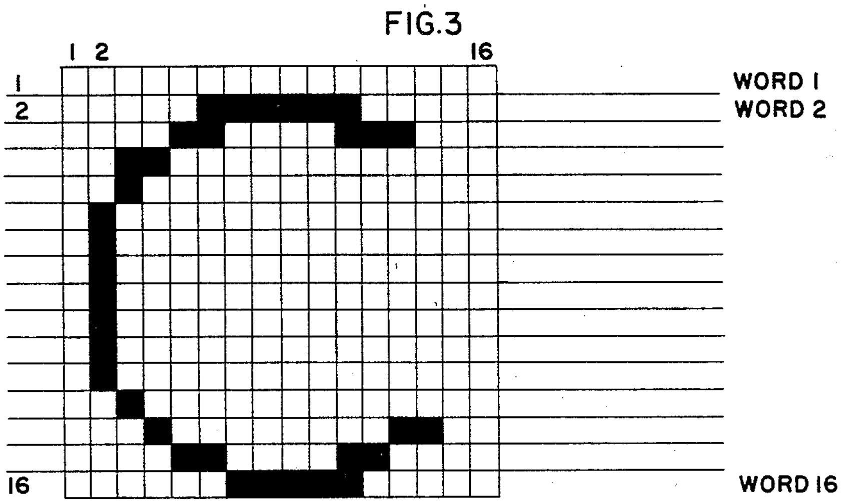
FIG. 3 is a diagram depicting the form of a particular character generated in accordance with the principles of the invention.

When a binary word has been accumulated in the input buffer register 4, its bit values are detected by conventional logical control elements arranged to perform overall functions such as are indicated by the blocks labelled location comparator LC, symbol comparator SC and library track selector S1. The symbol code is compared in the symbol comparator SC with bits from clock tracks to locate a first, or X, coordinate of a bit which forms a part of a desired word or message. When the symbol comparator determines that desired symbol elements have been located in the library a signal is transmitted to the processor control PC which supplies buffer control signals to blocks 14 and 16. Whenever the X coordinate bits in the buffer control signal coincide with the Y coordinate bits from the library track selector S1, buffer register 14 is gated to transmit signals from selected ones of the amplifiers A'1 through A'32 for storage in appropriate parts of the Picture Matrix Buffer 16. This process is repeated until an entire 16 x 16 matrix, such as is illustrated in FIG. 3, is contained in the Picture Matrix Buffer 16, where 16 may be a small magnetic core memory. As will be explained more fully later, in a preferred embodiment of the invention the proces of storing a symbol in a 16 x 16 matrix will be completed during the period of a vertical retrace of the beam in a cathode ray tube.

Once the symbol has been assembled in the memory 16, the required position of the charatcer on the display is determined by joint action of the location counter LC2 and location comparator LC using information from the drum supplied from the clock tracks through the clock read amplifier A34 and from the Input Register 4. The location comparator LC then supplies a signal to the processor control PC which in turn gives the command to write to the write register 6, to the head selector 7 and to appropriate amplifiers A1 through A32 while conveying an additional activate signal, or buffer control signal, to activate the Buffer 16. The symbol elements, or bits, appearing in Buffer 16 are then supplied line by line to the write register 6. From the write register they are supplied over the amplifiers A1 through A32 and the appropriate heads determined by the head selector 7 to the storage unit 12 where they are written in the appropriate tracks. They should at that time be in the proper format to be useable later in generating a raster scanned image.

The heart of the system shown in the block diagram of FIG. 1 would appear to lie in the storage unit 12 which, as indicated before, in a preferred embodiment of the invention is a magnetic drum. This unit is able to contain a complete frame of digital signals which can be utilized as part of a series of frames which may be produced flicker free on a cathode ray tube or as a result of projection using a deformable surface raster projecter. The frames can be changed, in part, from frame to frame by operation of the processor. As has been indicated previously, the storage drum contains a library of program symbols which can be called up by a binary word such as that indicated in Block 4 for display anywhere it is needed within the picture frame. If the storage unit is a magnetic drum, the library will ordinarily be contained in the portions of the drum which would be unused because they appear under the read-record heads during the time that a scan beam of the television screen is re-tracing from the bottom to the top of the screen. A magnetic drum has been used to implement the prototype equipment, however, storage disks and advanced core memories as well as other memory devices are also feasible for use as the storage device.

Figure 2A:
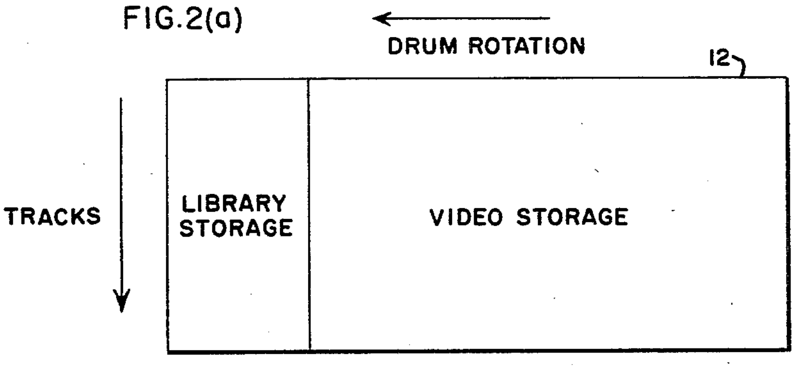
Figure 2B:
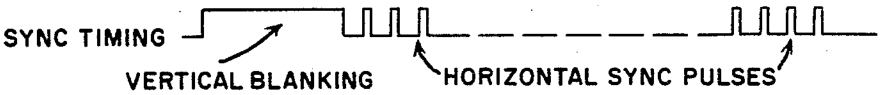
Figure 2C:
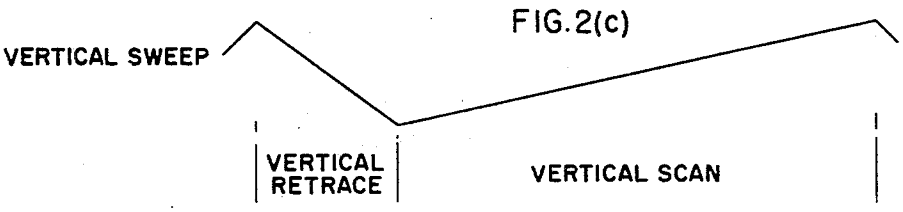

The organization of the library in the embodiment of the invention referred to in FIG. 1 will be clearer if reference is made to FIGS. 2(*a*), 2(*b*) and 2(*c*). The magnetic drum 12 is the same as that in FIG. 1, but with Library Storage and Video Storage shown arranged as they would be if the drum were cut and laid out flat. It will be evident from what follows that library storage will not be strictly in accordance with the showings of FIG. 1 or FIG. 2(*a*) and that its exact location on the face of the drum may vary widely for different operating conditions. Each character-symbol matrix is stored in the library portion of the drum as a group of digital words. This library area of the drum is located on the drum surface in an area which is under the read-record heads during the time that the television CRT or Cathode Ray Tube Beam retraces in the vertical direction. An exemplary position for the library storage area is indicated in FIG. 2(*a*). Below the drum format in FIGS. 2(*b*) and 2(*c*), respectively are shown timing wae shapes for oth the Sync and vertical retrace voltages. These are shown in time-position correspondence with the storage areas of the drum. It is readily noted that during the period that vertical blanking of the television raster occurs the library is available to the read heads of the drum. Since the screen is blank during this period the corresponding drum area is not used for video storage.

Data may be written in the video storage portion of the drum in either of two ways. In the first of these it is written, after its selection by various logic circuits, by application of parallel digital signals through the amplifiers A1 through A32 in the format prescribed by the library memory. This method of writing has been discussed. An alternative way of writing on the drum is through the generation of individual dots, the position of which is determined in accordance with information contained in a binary word such as is illustrated in Block 4. For dot generation, the symbol code at positions 21 through 28 is given as zero and the five least significant bits of the X position portion of the input data word are used to set a single bit into the thirty-two bit write register using the point plot encoder 20. The remaining X and Y positions bits will be used to located the cell where the data point is to be written on the drum.

In order to remove symbols from the video memory or to alter symbols in the video memory all that is required is that an erase signal instead of a write signal be supplied to the write amplifiers A1 through A32. This will cause zero to be written in the video memory corresponding to "ones" in the write register. Zeros appearing in the write register will be unaffected, as before.

The scanner 22 functions to gate sequentially the output of all the read amplifiers A'1 through A'32 in such a way that the signals are stepped up to video frequencies so they can operate the unit at 24 which, in a preferred embodiment, includes a cathode ray tube, but may incorporate an alternative display device such as a deformable surface projection display device. The exact manner in which the scanner accomplishes this end will be made clear, in connection with the discussion of FIG. 7, after the nature of the signals available to the scanner 22 has been explained by a more detailed discussion of the data processor as it functions to supply information to the storage unit 12.

It will be recognized that the symbol code referred to in input register 4 is actually a code for a symbol where a binary designation such as 10110101 (made up of binary bits and zeros at 21 through 28 of the block diagram) 28 of the block diagram) may represent a letter, such as C. This designation can be compared with the library portion of the memory, using the symbol comparator (which actually compares clock pulses and symbol code pulses to determine when locations coincide) to locate the correct set of signals required to generate a particular C on a raster format. A particular format is shown in FIG. 3 for a C made up of a 16 x 16 element matrix where each word contains the elements of a character for a single line. Once the particular desired set of signals has been located, it is read into the buffer register 14 and buffer memory 16 for recording. It is then ready to be read into the write register 6 and into the drum, when the drum reaches the position called for by the X and Y position designations in the input register.

Once a character format such as is shown in FIG. 3 has been chosen a means of organizing a number of these character matrices into a library is needed. FIGURE 3 shows the matrix divided into 16 words of 16 bits per word. Each word of the matrix contains only the elements of a character which will appear on a single line of the video raster. Thus, if the matrix is handled a word at a time, a line at a time of character will be constructed. This, in brief, is the way the raster line data is arranged sequentially line by line around the circumference of the drum.

The 16 words which describe the character matrix are located by line sequence in an area of the video memory assigned to the library. This is an area of the drum which appears under the read-record heads during the time the scan beam of the television screen is retracing from the bottom to the top of the screen. This interval represents approximately 7.5% of the lines in each field. Specifically in the case of a 525 line system this is approximately 20 scan lines of data requiring 16,667 micro-seconds per vertical sweep times 7.5% or 1250 micro-seconds per track. Since 256 symbols require $$256\times256=65,536 \text{ bits of storage}$$

each library portion of a drum track must contain $$65,536/64=1024 \text{ bits}$$

A library clock track is provided to accommodate this storage density in the library.

Figure 4:
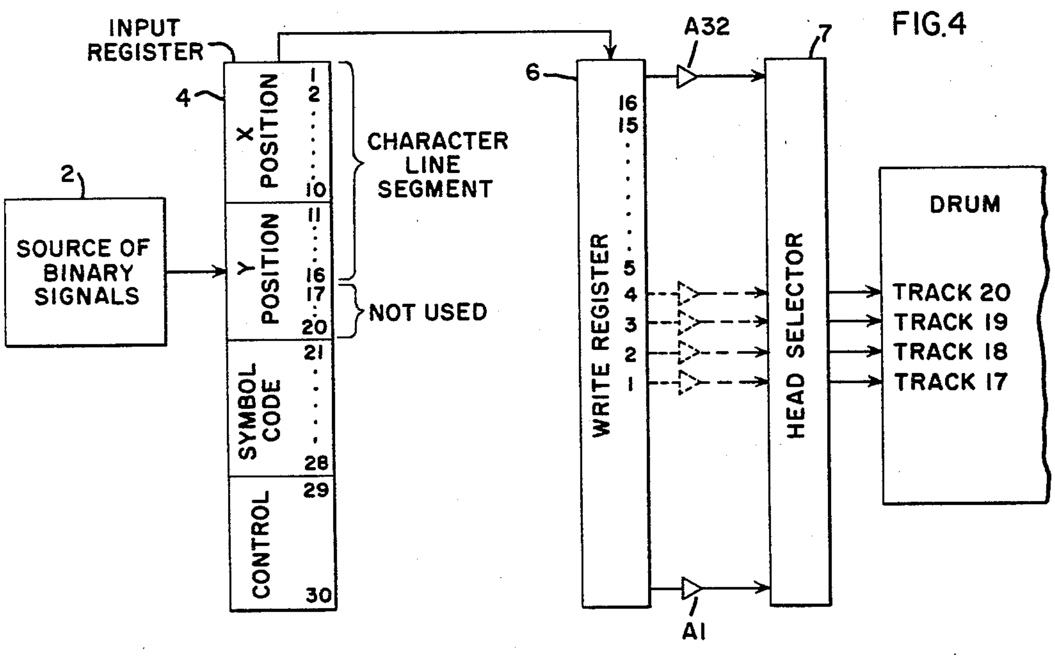
FIG. 4 is a block diagram of use in depicting how information may be written into the library portion of the memory.

A portion of FIG. 1 is shown with modifications in FIG. 4 in order to demonstrate the manner in which library words may be inserted into the library area. The library area is loaded from the digital data source 2 through the input register 4. The data source, for the purpose of loading the library, provides a number of digital words which contain line segment portions of the referred to character matrix together with the code for the symbol concerned. The equipment in FIG. 4 can be used to write these line segments on the appropriate library tracks of the drum. To accomplish this, the character line segment portion of the Input Data word is shifted to the write register 6. In the illustration, an example is shown in which 4 bit portions of a 16 bit line segment word are to be written on tracks 17 through 20 of the library. Shifting of this 16 bit word is performed until the first 4 bits of this word are opposite tracks 17 through 20. These bits are then written in the location specified by the symbol code. The next 4 bits of the 16 bit word are then shifted four positions down and written on the drum. This procedure is repeated until all 16 bits have been entered into the library. Sixteen of these 16 bit words are written into the library in a like manner to fully enter a single character matrix.

Figure 5:
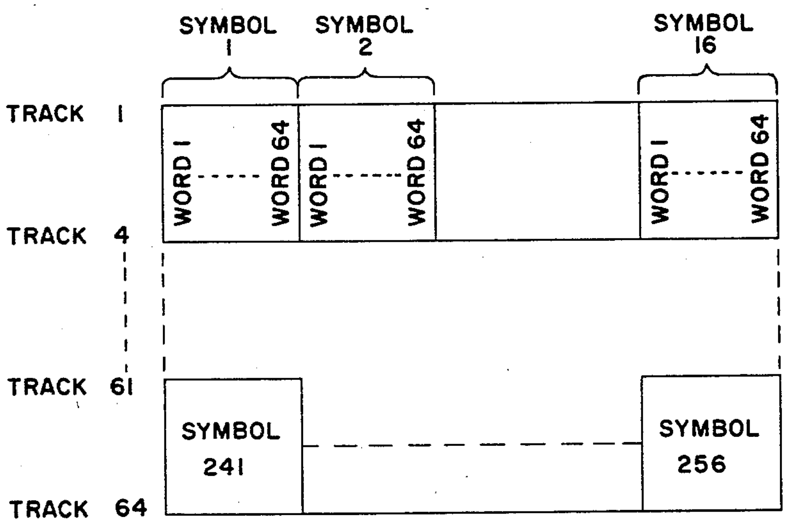
FIG. 5 depicts a typical library format.

Storage of character matrices in the library may be accomplished according to a number of conventional drum formatting procedures. FIG. 5 is given as being typical and corresponds to the arrangement referred to in the last paragraph. In the preferred embodiment shown in FIG. 5, character matrices are stored as a number of 4 bit digital words. For a 16 x 16 matrix each symbol would be stored as 64 four-bit words. Four tracks of the drum are needed to store each bit of the four-bit words in parallel. Each group of 16 symbols would require 4 tracks of 1024 bits each. Eight such 4 track groups will therefore accommodate 256 symbols.

The drum is driven at 3600 r.p.m. by a 3 phase synchronous motor. This is 60 cycles per second, or the same as the field rate of a 2:1 interlaced television system. Two drum revolutions therefore will be made during each video frame. This means that the drum will be divided into two basic areas. One area will contain the odd line information and will be scanned during the first of two revolutions. The other area will be scanned during the second of two revolutions.

Figure 6:
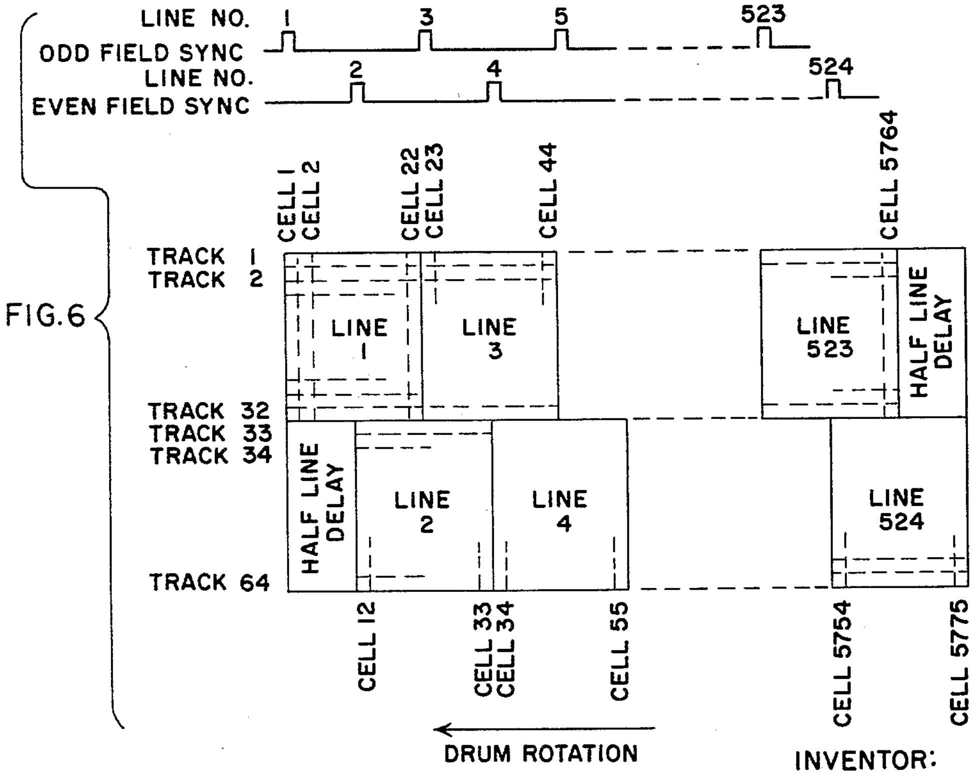
FIG. 6 is a diagram of use in determining the relationship between synchronization pulses and the video information recorded on a magnetic storage drum in a format used with the invention.

FIG. 6 shows the drum format in the video storage area as used with a standard 525 line television system and shows the relationship of the sync signals. The video storage area of the drum is divided into 5775 cells around the circumference of the drum. Along the axis of the drum the video storage area is divided into 64 bands or tracks. In a 525 line television system the number of elements in each horizontal scan line is $525\times\frac{4}{3}$ of 700 elements. This number of elements must be furnished to the display in $63.5\mu s$. This is equivalent, approximately, to a 11 mc. bit frequency $700/63.5(10^{-6})=11(10^{6})$ which is too high a rate for practical drum operation. By dividing the 700 elements per line by 32 and recording the 32 bits simultaneously in parallel a reduction in drum recording frequency is achieved. Now only 22 bits/line are needed per track per line while 32 tracks per line are required. A bit frequency of only 11 mc./32 or 345 kc. will now allow video data to be recorded on the drum. However, during one bit time 32 tracks must be sequentially scanned by the scanner-summer to form video at the original 11 mc. bit rate. Each line is now formatted as a block of data occupying 32 tracks and 22 cells/track or a total of 704 total elements per line. Tracks 1 through 32 will contain all the odd numbered lines 1, 3, 5 . . . 523. Tracks 33 through 64 will contain all the even numbered lines. Because of the interlace required by the 525 line TV standards it will be noted that a ½-line delay beween the odd and even fields is necessary.

The reading and writing of data in this format is handled as $525\times22$ or 11,550 thirty-two bit words for a total of $11,550\times32$ or approximately 370,000 controllable picture elements. Only 32 read-write amplifier sets are needed to read and write data on 64 tracks. Each read-record head is electronically switched between an even and an odd field track using conventional head switching techniques.

Only a 525 line TV system has been described here. This format is a typical example of the Display Data Processor formatting concept and it may be readily extended to include any system of scan line density within the frequency and drum capacity limits. It will also be recognized that a deformable surface projected display, as well as other displays may be operated from signals produced by the Display Data Processor.

The function of the Scanner is to sequentially gate the output of all read amplifiers on to the video line during each cell time. This scanning and summing is begun at the start of each block of horizontal elements in storage and continues through the end of the block without synchronization.

Figure 7:
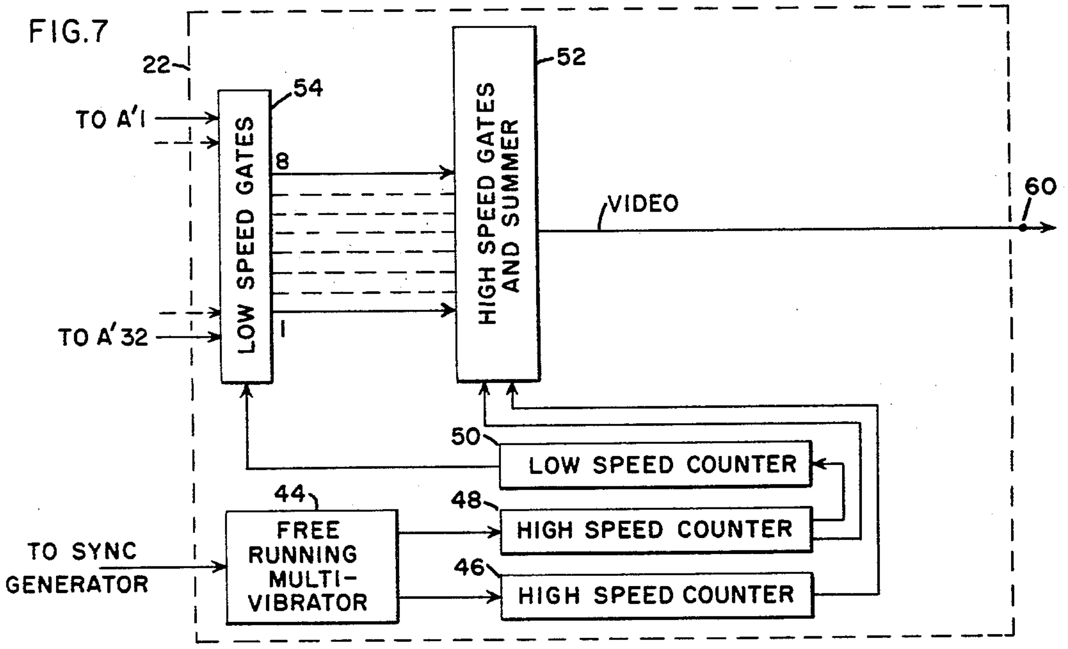
FIG. 7 is a block diagram showing a scanner consisting of an arrangement for converting signals received from a magnetic drum at relatively low frequencies to signals at video frequencies.
Figure 8:
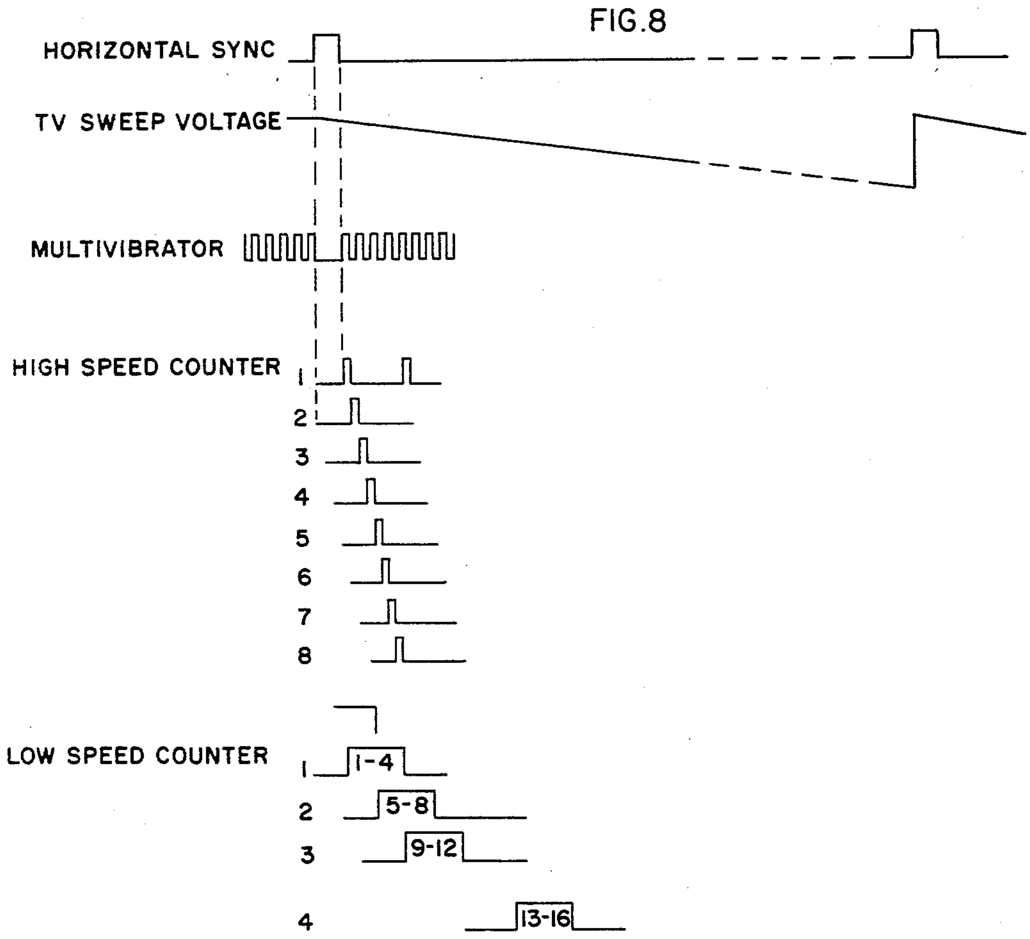
FIG. 8 depicts waveforms of importance to the operation of the scanner in FIG. 7.

A block diagram of the scanner is shown in FIGURE 7. The free running multivibrator 44 at the left of the diagram is controlled by the television raster horizontal synchronization pulses from the sync generator SG in FIG. 1. Each sync pulse will reset the counters and release the multivibrator. This process will cause the signals from the read amplifiers A'1 through A'32 to be phase locked to the horizontal sync pulse. FIGURE 8 shows a timing diagram of the scanner shown in FIGURE 7. It is the horizontal sync pulse which causes the TV sweep voltage to be generated. In order that a vertical line may be properly drawn in a raster, all elements of the line drawn in all scan lines must appear at the same point in time from the start of each horizontal sweep. This means that the multivibrator must start for each line at exactly the same time and phase as measured with respect to the horizontal sync pulse which initiated the TV sweep voltage. To assure the proper start of the multivibrator 44, one terminal is clamped to ground by the horizontal sync pulse. At the termination of the sync pulse the multivibrator will begin its first cycle always in the same phase.

Once the multivibrator is free to oscillate it will provide output signals over two lines as clock pulses at separate phases and at the frequency dictated by the video bandwidth of the system. These two clock pulses are used to drive two high speed counters 46 and 48. As shown in the timing digram, these two counters are devised to produce 8 scanning pulses for each pulse produced by the low speed counter. Each of the high speed scanner pulses is the same width as one picture element. The 8 pulses from counter 46 are used by the high speed gates 52 to gate the output of the low speed gates 54 onto the video line. By separating the scanner into high speed and low speed functions high frequency video generation is limited to only a relatively few video frequency components.

It is the function of the low speed counter 50 and the low speed gates 54 to gate the output of the 32 read amplifiers from the drum into the inputs of the 8 high speed gates in block 52. The low speed gates 54 will gate the 32 amplifier bits four at a time to the high speed gates 52. Because circuit delays are critical at video frequencies the low speed counter accomplishes look ahead gating. This means that while the high speed counter is actually scanning inputs 1 through 4, inputs 5 through 8 are being gated on. While 5 through 8 are being scanned, 1 through 4 will be gated off and 9 through 12 will be gated on. This process is repeated until all 32 amplifiers have been scanned. Once all 32 amplifiers have been scanned this process will also be repeated until all 22 line cells of 32 tracks have been scanned. The result is a horizontal TV scan line at terminal 60 of uninterrupted digital video.

Figure 9:
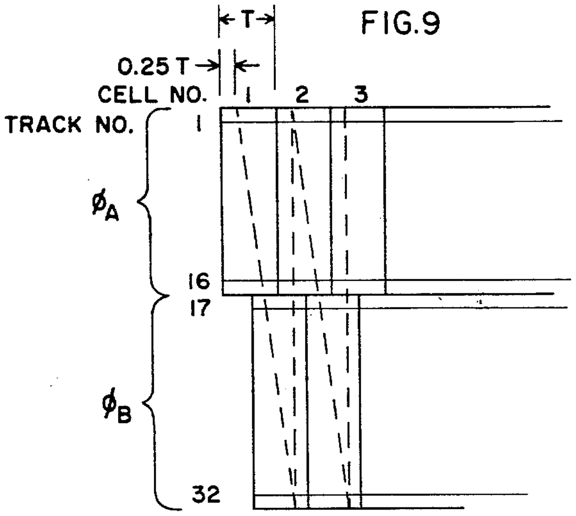
FIG. 9 shows a mode of recording data on a magnetic drum to alleviate the effects of hunting by the drum.

A storage drum at best is an unstable device. It continuously speeds up and slows down by small amounts. This hunting is caused by the fields of the synchronous drive motor attempting to align themselves. The exact magnitude of hunting is of the order of only a few microseconds per revolution. However, with video pulses of under 100 nanoseconds width the scanner can gate erroneous data from adjacent bit cells. This effect is controlled in an embodiment of this invention by storing the data in a horizontal line data block in two phases as shown in FIG. 9. The first such phase $\phi_A$ is used to store data on tracks 1 through 16. Phase $\phi_B$ is used to store data on tracks 17 through 32. This allows the scanning of a data block to begin 25% of the way into a cell and adequately compensates for errors from this source.

So far only the presence or absence of a picture element has been discussed. The Display Processor can easily be extended to control the color and intensity of each element of the pictures. Such an extension to control of color and intensity of picture elements would not alter the basic operation of the Processor. Such functions as library, video scanning, data writing and plotting would be accomplished as previously described. The first new requirement would be the representation of each picture element by a quality code. The number of bits in this code would be determined by the number of levels of intensity and/or the number of colors desired. For example, a 3 color system requires a quality code of 2 bits. An 8 level of intensity system requires a 3 bit quality code. A 3 color-8 level system would require a five bit quality code.

The input data would, of course, necessarily be coded to contain additional bits to specify color and intensity. The library look up and symbol assembly in the write register would remain unchanged, but additional write drivers and an encoder would be needed to handle the writing of the picture element quality code. At readout time from the drum each bit of the quality code would be separately scanned and routed to a decoder. If the quality bits specified color, the video bit for the element to be displayed would be placed on one of three video color lines to the color television monitor. If intensity were specified, the quality bits would be used to produce a video pulse whose amplitude would be the analogue of the digital quality intensity code.

While specific embodiments of my invention have been shown and described, it will be understood that various modifications may be devised by those skilled in the art which will embody the principles of the invention and it is contemplated by the appended claims to cover all such modifications as fall within the true spirit and scope of my invention.

What I claim as new and desire to secure by Letters Patent of the United States is:

1. A display data processor for converting digital messages to video signals suitable for controlling a raster generated display, comprising:

(a) input means for accepting digital messages containing binary signals conveying symbol information, position information and function control information;

(b) library memory means including write and read means and providing library storage for a plurality of symbols each entered therein as a compilation of binary signals together defining that symbol;

(c) buffer memory means providing buffer storage for symbol defining binary signals read from said library memory;

(d) symbol control means connected to said input means and responsive to symbol information contained in said input messages for identifying the location in said library memory at which the binary signals representative of a desired symbol are to be written or read;

(e) function control means connected to said input means and responsive to function control information contained in said input messages for effecting selectively the transmittal from said input means of binary signals representing said desired symbol for entry in said library memory at the location therein identified as aforesaid by said symbol control means or the transmittal from said library memory to said buffer memory of the desired symbol signals previously thus entered in said library memory;

(f) video memory means including write and read means and providing video storage for a plurality of binary signals each defining a controllable picture element of one video frame;

(g) position control means connected to said input means and responsive to position information contained in said input messages for effecting the writing of said binary signals representing said desired symbol as stored in said buffer memory into said video memory at locations therein corresponding to desired symbol position on the display; and (h) means for scanning said video memory and for generating from the output thereof video signals suitable for imaging the desired symbol at the desired position in a raster generated display.

2. A display data processor as defined in claim 1 wherein said means for generating video signals from the video memory output signals includes:

(a) a plurality of low speed gates for gating a like plurality of said output signals at one time to produce low speed gated signals; and (b) a plurality of high speed gates for gating each of said low speed gated signals serially to provide the high speed video signals.

3. A display data processor as defined in claim 1 further comprising:

(a) encoder means connected to said input means and responsive to said input digital messages for providing binary signals representative of an individual point plot; and (b) processor control means connected to said input means, to said encoder means and to said buffer memory, and selectively operable in response to said input digital messages to disable the writing into said video memory of symbol-defining signals from said buffer memory and to enable the writing of point-defining signals from said encoder into said video memory at locations therein determined by said position control means.

4. A display data processor for converting digital messages to video signals suitable for controlling a raster generated display, comprising:

(a) input means for accepting digital messages containing position and symbol information;

(b) first memory means providing library storage for a plurality of symbols each entered therein as a compilation of binary signals together defining that symbol;

(c) second memory means providing buffer storage for binary signals read from said first memory means;

(d) symbol control means responsive to said input messages for selecting from said first memory and transmitting to said second memory binary signals representative of a stored symbol selected in accordance with the symbol information contained in said input messages;

(e) third memory means providing video storage for binary signals constituting one video frame;

(f) encoder means responsive to said input messages for providing binary signals representative of an individual point plot;

(g) processor control means responsive to said input messages for effecting selectively the writing of said symbol-defining binary signals from said second memory or the writing of said point plot binary signals from said encoder into said third memory at locations therein selected in accordance with the position information contained in said input messages; and (h) means for scanning said third memory means to generate a video signal suitable for imaging the desired symbols and points at the desired positions in a raster generated display.

5. A display data processor for converting digital messages to video signals suitable for controlling a raster generated display, comprising:

(a) input means for accepting digital messages containing binary signals conveying symbol information and position information;

(b) sequence scanned memory means providing library storage for a first plurality of binary signals defining a number of display symbols, and providing video storage for a second plurality of binary signals each defining a controllable picture element of one video frame;

(c) buffer means for temporary storage of binary signals transmitted thereto from said library storage;

(d) video signal means for generating video signals suitable for a raster generated display from binary signals transmitted thereto from said video storage;

(e) write and read means for writing and reading binary signals into and out of said library storage and video storage sequentially;

(f) read control means responsive to said received digital messages for transmitting the read signal output from said memory read means to said buffer means when reading out said library storage and to said video signal means when reading out said video storage;

(g) write control means responsive to said received digital messages operatively connecting said memory write means for signal input from said buffer means when writing into said video storage and for signal input from said input means when writing into said library storage;

(h) symbol control means responsive to said input messages for limiting read out from and write into said library storage to locations therein selected in accordance with symbol information contained in the input messages; and (i) position control means responsive to said input messages for limiting write into said video storage to locations therein selected in accordance with position information contained in the input messages.

6. A display data processor as defined in claim 5 wherein said received digital messages also contain point plot signals, and wherein the processor further includes processor control means connected to said input means and selectively operable in response to said received digital messages to disable display signal input from said buffer means to said write means and to enable the transmittal of point plot signals from said input means to said write means for writing point display signals into said video storage at locations therein selected by said position control means.

7. A display data processor for converting digital messages to video signals suitable for controlling a raster generated display, comprising:

(a) input means for accepting digital messages containing binary signals conveying symbol information, position information and control information;

(b) a library memory including write and read means and providing library storage for a plurality of symbols each entered therein as a compilation of binary signals together defining that symbol;

(c) a buffer memory providing buffer storage for symbol defining binary signals read from said library memory means;

(d) symbol control means connected to said input means and responsive to symbol information contained in said input messages for identifying the location in said library memory at which the symbol defining binary signal is stored;

(e) a video memory including write and read means and providing video storage for a plurality of binary signals each defining a controllable picture element of one video frame;

(f) processor control means connected to said input means and selectively operable in response to said input digital messages to read symbol-defining binary signals from said library memory at locations therein identified by said symbol control means and to store said signals in said buffer memory, then to read out the signals thus stored and enter them in said video memory at locations therein determined in accordance with the position information contained in said input messages;

(g) said processor control means being further selectively operable in response to said input digital messages to enter symbol-defining binary signals in said library memory in format and at locations therein determined in accordance with the position and symbol information contained in said input messages;

(h) said processor control means being further selectively operable in response to said input digital messages to enter into video storage binary signals defining individual points to be plotted at locations determined in accordance with position information contained in said input messages; and (i) means for scanning said video memory to generate a video signal suitable for imaging the desired symbols and points to be plotted at their desired positions in a raster generated display.

References Cited

UNITED STATES PATENTS

| | | | |
|---|---|---|---|
| 3,069,681 | 12/1962 | Sloan | 340—324.1 |
| 3,090,041 | 5/1963 | Dell | 340—324.1 |
| 3,098,119 | 7/1963 | Lemelson | 340—172.5 |
| 3,130,397 | 4/1964 | Simmons | 340—324.1 |
| 3,158,858 | 11/1964 | Ragen et al. | 340—324.1 |
| 3,241,120 | 3/1966 | Amdahl | 340—324.1 |
| 3,256,516 | 6/1966 | Melia | 340—324.1 |
| 3,248,705 | 4/1966 | Dammann et al. | 340—324.1 |
| 3,292,154 | 12/1966 | Simmons | 340—324.1 |
| 3,293,614 | 12/1966 | Fenimore et al. | 340—324.1 |
| 3,307,156 | 2/1967 | Durr | 340—324.1 |

JOHN W. CALDWELL, *Primary Examiner.*

A. J. KASPER, *Assistant Examiner.*